Dec. 18, 1956
I. F. BARDITCH
2,774,942
TIME MODULATORS
Filed Feb. 2, 1953
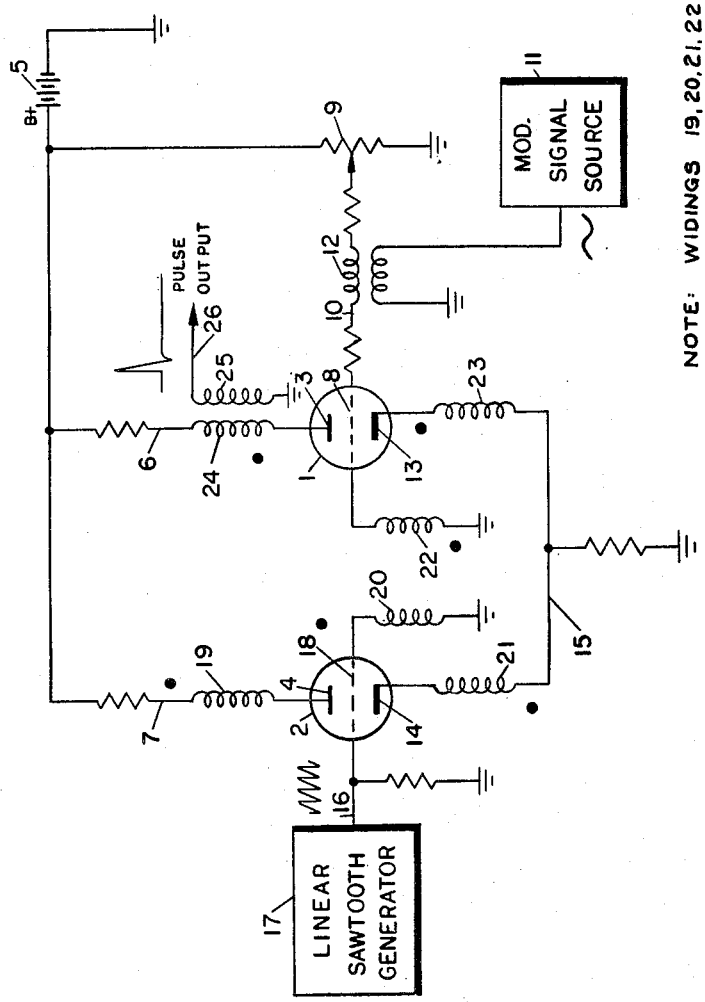
INVENTOR.
IRVING F. BARDITCH
BY

United States Patent Office 2,774,942
Patented Dec. 18, 1956

2,774,942

TIME MODULATORS

Irving F. Barditch, Baltimore, Md., assignor to Aircraft Armaments, Inc., Baltimore, Md., a corporation of Ohio Application February 2, 1953, Serial No. 334,623

5 Claims. (Cl. 332—9)

This invention relates to voltage comparators and more particularly to a time modulator employing a multiple winding transformer for effecting current regeneration in an electrical circuit whereby to produce time modulated pulses.

It is desirable that the output pulses of a time demodulator rise nearly vertically without accompanying oscillations since such a modulator is normally used for triggering electrical devices such as a signal generator at accurately controlled time intervals. With conventional time modulators, it is necessary to employ differentiating circuits to improve the output pulse form. These additional correcting circuits normally required for conventional time modulators may be eliminated in the time modulator of this invention.

An object of this invention is to provide a time modulator having a multiple winding transformer for increasing current regeneration whereby a time modulated pulse output having a very short rise time is obtained, eliminating the need for differentiating circuits for improving the pulse shape.

Another object of this invention is to provide a time modulator of simple design and which is accurate and dependable in operation.

Further and other objects will become apparent from a reading of the following detailed description when considered in combination with the accompanying drawings wherein like numerals refer to like parts.

In the drawing:

The single figure is a schematic circuit diagram of the time modulator of this invention.

As shown in the figure, the time modulator includes a pair of vacuum tube electron discharge devices 1 and 2. Anode 3 of tube 1 and anode 4 of tube 2 connect with a suitable D. C. voltage source such as battery 5 through leads 6 and 7, respectively. A D. C. biasing voltage is applied to a control grid electrode 8 of tube 1 from battery 5 through a voltage dividing resistor 9. A modulating signal from a modulating signal source 11 is combined in lead 10 with the D. C. biasing voltage applied to grid 8 by means of transformer 12. Cathode 13 of tube 1 connects directly with cathode 14 of tube 2 through a common lead 15.

The D. C. biasing voltage applied to grid 8 is such that the modulating signal may be employed to control the current flow through tube 1 without cutting it off whereby the voltage at cathode 14 is made proportional to the voltage variation of the modulating signal.

A sawtooth time reference output 16 from a linear sawtooth generator 17 is applied to control grid 18 of tube 2 for controlling current flow therethrough. The frequency of the sawtooth wave energy generated by generator 17 is higher than the frequency of the modulating signal applied to grid 8 so that a large number of full sawtooth waves will be produced for every full modulating signal wave. Also, for complete modulation, the voltage rise of the sawtooth must be at least as great as the voltage variation in the modulating signal. The bias voltage thus applied to grid 18 prevents the tube from conducting until the grid voltage has risen sufficiently to fire the tube at the applied cathode voltage which will occur at some point on every sawtooth wave.

Primary coil 19 of a multiple winding transformer is connected in series with lead 7 to receive current flowing in the anode circuit of tube 2. Secondary coils 20, 21, 22, 23 and 24 of the multiple winding transformer are connected to the remaining tube elements as shown in the drawing wherein the dots indicate like polarities of the windings. As tube 2 starts to conduct, current is caused to flow in primary coil 19 which induces a voltage in the secondary coils in such a manner that the voltage applied to grid 18 is increased and the voltage applied to cathode 14 is decreased to cause the tube 2 to conduct still more while the voltage applied to cathode 13 is increased and the voltages applied to the grid and anode elements of tube 1 are decreased, cutting it off. Thus as tube 2 starts to conduct, the transformer, by increasing the current flow through tube 2 and cutting off current flow through tube 1, activates the circuit, producing a surge in current which is substantially instantaneous.

A pick-up coil 25 is arranged adjacent to secondary coil 24 so that current will be induced therein as a result of the surging current flow in tube 2 whereby a pulse output is obtained at 26.

The operation of the time modulator is believed obvious from a reading of the foregoing description. The modulating signal from source 11 is combined with the D. C. biasing voltage applied to grid 8 of the tube 1 for controlling the current flow therethrough without cutting it off, whereby the voltage at cathode 13 is made proportional to the modulating signal voltage. Since cathode 13 of tube 1 connects directly with cathode 14 of tube 2 through common lead 15, the voltage at cathode 14 is also proportional to the modulating signal voltage. When the sawtooth voltage applied to grid 18 of tube 2 has risen relative to the voltage at cathode 14 sufficiently to cause tube 2 to conduct, current flowing in the anode circuit will pass through primary coil 19 of the multiple winding transformer. This substantially instantaneous current build-up in coil 19 induces a voltage in the secondary coils connecting with the anode, cathode and grid of tube 1 and with the cathode and grid of tube 2. The polarity of secondary coils 20 and 21 is such as to cause an increase in current flow through tube 2 while the secondary coils 22, 23 and 24 connecting with the elements of tube 1 are of such polarity as to drive it beyond cut-off. This action whereby tube 2 is caused to conduct and tube 1 is driven beyond cut-off activates the circuit and produces a rapidly decreasing current flow from which the desired time modulated output pulse is obtained at 26. Once tube 2 starts to conduct it will remain conducting until the sawtooth reference signal voltage has dropped, at which time tube 2 is cut-off and tube 1 is again permitted to conduct at a rate controlled by the modulating signal applied to grid 8. As pointed out, the cathode voltage of tube 2, while tube 1 is conducting, is proportional to the modulating signal voltage. Therefore, when a second sawtooth wave appears at grid 18, the voltage at cathode 14 will have changed in accordance with the modulating signal voltage and therefore require a different grid voltage in tube 2 to cause it to fire. As the second sawtooth time reference voltage increases, a point will be reached which will allow tube 2 to again conduct and effect current flow through primary coil 19 as previously described to cause tube 1 to be driven beyond cut-off and increase the current flow through tube 2. The surge of current thus produced represents the desired time modulated output pulse which will be obtained in the described manner for every sawtooth wave applied to the grid of tube 2 wherein the spacing between pulses will depend upon the amplitude of the modulating signal.

The push and pull type of action obtained by the multiple winding transformer effects rapid and positive switching action between tubes 1 and 2 in the time modulator to produce the desired nearly vertical time modulated output pulses. Thus differentiating circuits to shape the pulses are unnecessary.

Though a specific embodiment has been shown and described, it is to be understood that certain changes, modifications and substitutions may be made without departing from the spirit and scope of the invention as defined by the appended claims.

I claim:

1. A time modulator comprising, a pair of electron discharge devices, each including an anode, a cathode and a control grid electrode, a source of direct current potential connecting with each said anode, a modulating signal source connecting with the grid of one of said electron discharge devices for controlling current flow therethrough, the cathodes of said electron discharge devices being connected together for maintaining a common cathode voltage for both said pair of electron discharge devices which is proportional to said modulating signal voltage, a sawtooth wave generator, generating linear sawtooth wave energy at a frequency greater than the frequency of said modulating signal and connecting with the grid of the other of said electron discharge devices for effecting current flow therethrough when said sawtooth wave energy has risen sufficiently with respect to said modulating signal voltage and inductive means regeneratively coupling the plate to cathode circuit of said other of said electron discharge devices with the plate to cathode circuit of said one of said electron discharge devices and with the grid circuits of both of said electron discharge devices to augment current flow through said other of said electron discharge devices and simultaneously driving said one of said electron discharge devices beyond the cut-off when current flow is effected through said other of said electron discharge devices.

2. A time modulator comprising, a modulating signal source, a linear sawtooth generator generating sawtooth wave energy at a frequency higher than the frequency of said modulating signal, voltage comparing means including a pair of electron discharge devices, one of said pair of electron discharge devices being responsive to said modulating signal and having an output voltage proportional to said modulating signal, the other of said pair of electron discharge devices being responsive to said output voltage from the first mentioned electron discharge device to have its cut-off point varied in accordance with the magnitude of said modulating signal and to said sawtooth voltage to be rendered conducting when the instantaneous value of said sawtooth voltage is sufficiently high with respect to said modulating signal, regenerative means responsive to current flow through said other of said pair of electron discharge devices for driving said one of said pair of electron discharge devices beyond cut-off when current flow is initiated in said other of said pair of electron discharge devices, and means for producing an output pulse in response to cessation of current flow upon cut-off of said one of said pair of electron discharge devices.

3. A time modulator comprising, a pair of electron tubes, means generating a modulating signal applied to a grid of one of said tubes to control current flow therethrough, means forming a common cathode connection between said tubes, so that the cut-off point of the other of said tubes is caused to vary in accordance with the amplitude of said modulating signal, means for applying wave energy having a frequency higher than said modulating signal to the grid of said other of said tubes and having sufficient amplitude to drive said other of said tubes beyond cut-off for each cycle of said wave energy whereby said other of said tubes is allowed to conduct during a portion of each said cycle, inductive means responsive to change in current flow through said other of said tubes to render said one of said tubes nonconducting, and means responsive to change in current flow through said one of said tubes to produce an output voltage impulse.

4. A time modulator comprising, a pair of electron tubes, means generating a modulating signal for controlling current flow through one of said tubes, means forming a common cathode connection between said tubes so that the plate voltage of each of said tubes varies as a function of said modulating signal, means generating sawtooth wave energy at a frequency higher than said modulating signal, the other of said tubes being responsive to said sawtooth wave energy to be rendered conducting when the magnitude of said sawtooth energy has reached a point sufficiently high with respect to the plate voltage of said other of said tubes, inductive means coupling the plate and the grid of said other of said tubes to produce regenerative action augmenting current flow in said other of said tubes and coupling the plate of said other of said tubes and the grid of said one of said tubes to drive said one of said tubes beyond cut-off upon increase in current flow in said one of said tubes, and means responsive to change in current flow when said one of said tubes is cut off to produce an output voltage pulse.

5. A time modulator comprising, a pair of electron discharge devices, each including a cathode, an anode and a control grid electrode, a source of direct current potential connecting with the grid of one of said electron discharge devices, a modulating signal source also connecting with said grid for controlling current flow through said one of said electron discharge devices, said cathodes having a common connection so that the cathode voltage of the other of said electron discharge devices is maintained at a voltage proportional to said modulating signal, biasing means for maintaining the grid voltage of said other of said electron discharge devices at a value beyond cut-off, a sawtooth wave generator generating linear sawtooth wave energy at a frequency greater than the frequency of said modulating signal and connecting with the grid of said other of said electron discharge devices for effecting current flow therethrough when the instantaneous value of said sawtooth voltage has reached a value sufficiently high with respect to said modulating signal, transformer means comprising a plate connected winding and a cathode connected winding in the plate to cathode circuit of each said electron discharge device, and a grid connected winding in the grid circuit of each said electron discharge device, the polarities of said windings being arranged to produce regeneration in said other of said electron discharge devices when current flow is effected therethrough, thereby effecting substantially instantaneous switching action between said electron discharge devices, and means responsive to said switching action to produce time modulated output pulses.

References Cited in the file of this patent

UNITED STATES PATENTS

| | | |
|---|---|---|
| 2,437,970 | Reich | Mar. 16, 1948 |
| 2,495,168 | Houghton | Jan. 17, 1950 |
| 2,497,411 | Krumhansel | Feb. 14, 1950 |
| 2,616,048 | Rubin | Oct. 28, 1952 |
| 2,643,330 | Borgeson | June 23, 1953 |